United States Patent
Cudak et al.

(10) Patent No.: US 9,641,390 B2
(45) Date of Patent: May 2, 2017

(54) AUTOMATIC CONFIGURATION OF SWITCH PORT SETTINGS BASED ON THE DEVICE ATTACHED TO THE SWITCH PORT

(71) Applicant: Lenovo Enterprise Solutions (Singapore) Pte. Ltd., Singapore (SG)

(72) Inventors: Gary D. Cudak, Wake Forest, NC (US); Shareef F. Alshinnawi, Apex, NC (US); Edward S. Suffern, Durham, NC (US); J. Mark Weber, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 63 days.

(21) Appl. No.: 14/723,021

(22) Filed: May 27, 2015

(65) Prior Publication Data

US 2016/0352574 A1    Dec. 1, 2016

(51) Int. Cl.
*H04L 12/28* (2006.01)
*H04L 12/24* (2006.01)
*H04L 12/725* (2013.01)

(52) U.S. Cl.
CPC ...... *H04L 41/0886* (2013.01); *H04L 41/0816* (2013.01); *H04L 45/30* (2013.01)

(58) Field of Classification Search
CPC .. H04L 41/0886; H04L 41/0816; H04L 45/30
See application file for complete search history.

(56) References Cited

U.S. PATENT DOCUMENTS

| | | | | |
|---|---|---|---|---|
| 2008/0263185 A1* | 10/2008 | Anderson | ........... | H04L 41/0213 709/220 |
| 2013/0336165 A1* | 12/2013 | Wakumoto | .............. | H04L 41/12 370/255 |
| 2014/0122753 A1* | 5/2014 | Chiu | ..................... | G06F 3/0653 710/74 |

* cited by examiner

*Primary Examiner* — Afshawn Towfighi
(74) *Attorney, Agent, or Firm* — Jeffrey L. Streets

(57) ABSTRACT

A method includes, for each of a plurality of configured switch ports, identifying switch port settings being used by the configured switch port and device parameters of an installed device connected to the configured switch port. The method further includes correlating one or more of the device parameters to one or more of the switch port settings. In response to an additional device being connected to an additional switch port, the method obtains device parameters of the additional device and automatically configures the additional switch port to use the one or more of the switch port settings that are correlated to one or more of the device parameters matching the device parameters of the additional device.

25 Claims, 5 Drawing Sheets

| SWITCH PORT TABLE 20 | | | | | | | | |
|---|---|---|---|---|---|---|---|---|
| 21 | SWITCH PORT SETTINGS 22 | | | DEVICE PARAMETERS 23 | | | | |
| SWITCH PORT ID (S/P) | VLAN(s) | QUALITY OF SERVICE | LAYER 3 OPTIONS | DEVICE TYPE | DEVICE MODEL | HARDWARE CONFIG. | OPERATING SYSTEM | DEVICE PORT | TYPE OF NETWORK TRAFFIC |
| 1/1 | A | 4 | | SERVER | MT 5463 | | | | FCoE |
| 1/2 | A | 3 | | SERVER | | | | | |
| 1/3 | | | | | | | | | |
| *** | | | | | | | | | |
| 2/1 | A | 4 | | SERVER | MT 5463 | | | | FCoE |
| 2/2 | A | 3 | | SERVER | | | | | |
| 2/3 | | | | SWITCH | | | | | |
| *** | | | | | | | | | |
| 3/5 | A | 4 | | SERVER | MT 5463 | | | | FCoE |

FIG. 4

AUTOMATIC CONFIGURATION OF SWITCH PORT SETTINGS BASED ON THE DEVICE ATTACHED TO THE SWITCH PORT

BACKGROUND

Field of the Invention

The present invention relates to the configuration of a switch within a particular computer system.

Background of the Related Art

The computer system in a datacenter may be upgraded or expanded over time to meet growing workloads. A new server, rack, switch or other components may be added to increase the capacity of the computer system to perform one or more function. However, a considerable amount of time and effort may be required to configure the new components to work as desired.

Switches, in particular, are generally set up to partition network traffic using virtual local area networks (VLANs) and may have specific port settings for various types of systems. A user may manually configure each switch through a user interface in order to provide each switch port with the desired switch port settings so that the upgraded or expanded computer system will function as desired. Furthermore, the configuration of a switch may occur incrementally over time as new or different devices are added to the computer system.

BRIEF SUMMARY

One embodiment of the present invention provides a method comprising, for each of a plurality of configured switch ports, identifying switch port settings being used by the configured switch port and device parameters of an installed device connected to the configured switch port. The method further comprises correlating one or more of the device parameters to one or more of the switch port settings. In response to an additional device being connected to an additional switch port, the method obtains device parameters of the additional device and automatically configures the additional switch port to use the one or more of the switch port settings that are correlated to one or more of the device parameters matching the device parameters of the additional device.

Another embodiment of the present invention provides a computer program product comprising a non-transitory computer readable storage medium having program instructions embodied therewith, the program instructions executable by a processor to cause the processor to perform a method. The method comprises, for each of a plurality of configured switch ports, identifying switch port settings being used by the configured switch port and device parameters of an installed device connected to the configured switch port. The method further comprises correlating one or more of the device parameters to one or more of the switch port settings. In response to an additional device being connected to an additional switch port, the method obtains device parameters of the additional device and automatically configures the additional switch port to use the one or more of the switch port settings that are correlated to one or more of the device parameters matching the device parameters of the additional device.

BRIEF DESCRIPTION OF THE SEVERAL VIEWS OF THE DRAWINGS

FIG. 4 is an example of a switch port table showing, for each configured switch port, the switch port settings for the switch port and device parameters for the device connected to the switch port.

DETAILED DESCRIPTION

Figure 1:
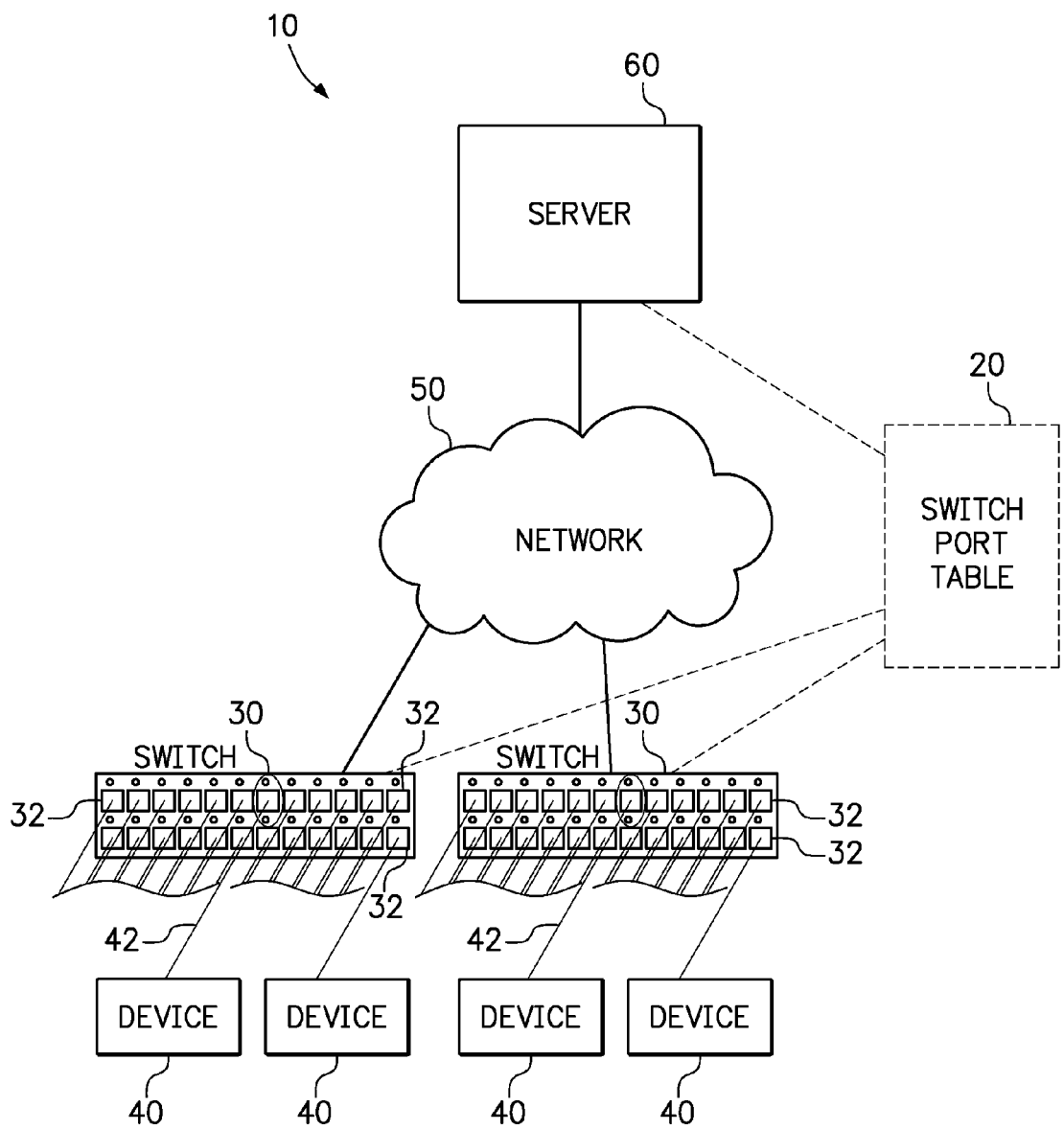
FIG. 1 is a diagram of a computer system that stores a switch port table describing the switch port settings for each port of each switch within the computer system.

One embodiment of the present invention provides a method comprising, for each of a plurality of configured switch ports, identifying switch port settings being used by the configured switch port and device parameters of an installed device connected to the configured switch port. The method further comprises correlating one or more of the device parameters to one or more of the switch port settings. In response to an additional device being connected to an additional switch port, the method obtains device parameters of the additional device and automatically configures the additional switch port to use the one or more of the switch port settings that are correlated to one or more of the device parameters matching the device parameters of the additional device.

The computer system may be any computer system that includes one or more switches and multiple devices in communication over those switches. For example, the computer system may include a local area network (LAN), wide area network (WAN), or other network topology. The devices that are connected to the one or more switches are unlimited in type and configuration, but may include servers, data storage devices and other switches.

The plurality of configured switch ports may be included in a single switch or distributed among any number of switches. Furthermore, each switch may be fully configured with each port connected to a device, or one or more of the switches may have one or more unconfigured switch ports available for connection with an additional device. Accordingly, an additional device may be connected to an additional switch port without requiring the installation of an additional switch, although the installation of an additional switch is within the scope of the present invention.

As the term is used herein, an "unconfigured switch port" is meant to include any misconfigured switch port, such as a switch port that was previous configured for a device other than the device that is currently connected to the switch port or a switch port that has certain default switch port settings without regard to the device that is currently connected to the switch port. In other words, a "configured switch port" has switch port settings that are appropriate or optimized for the device that is currently connected to the switch port.

The device parameters may include any characteristic or specification about the device, but will typically focus on readily available parameters that may be more likely to be correlated with one or more of the switch port settings. For example, vital product data (VPD) for the device may include the most readily available parameters, but the device parameters are not limited to VPD. Non-limiting examples of device parameters includes a device type, a device hardware configuration, a device port that is connected to the switch port, and a device operating system. In one specific example, the device parameters may include a device type, and the switch port table may be used to correlate the device type to one or more of the switch port settings. In another specific example, the device parameters may include a device hardware configuration identifying an amount of memory, any data storage devices, and network adapters. In a still further example, the device parameters may identify the type of a device port that is connected to the switch port, such as the device's integrated management module (IMM) port, data port, shared port, port 1, or port 2.

The device parameters of the additional device may be obtained in various ways. In one option, the switch may send a request for device parameters to the additional device that is connected to the switch through the additional switch port and then receive the device parameters from the additional device through the additional switch port. The request for the device parameters may be, without limitation, an intelligent platform management interface (IPMI) message. In another option, the additional device may be set up to automatically send certain device parameters to the switch in response to detecting a connection to the additional switch port. Typically, the additional device is connected to the additional switch port with a cable. It should also be recognized that the device parameter data in the switch port table may be obtained and collected in an ongoing manner in accordance with either or both of the foregoing options. Therefore, the switch port table may grow over time as more devices and/or more switches are added to the system.

One or more of the device parameters may be correlated to one or more of the switch port settings using any measure of dependence. For example, a correlation may be determined to exist where the switch port table shows that one or more device parameter is always associated with one or more switch port setting. Alternatively, a correlation may be determined to exist where the switch port table shows that one or more device parameter is associated with one or more switch port setting using a lesser frequency, such as more likely than not (i.e., greater than half of the occurrences of the device parameter), or more than any other (i.e., the device parameter is associated with the switch port setting more than any other switch port setting), etc. Furthermore, a correlation may be determined to exist the where the switch port table shows that one or more device parameter has been associated with one or more switch port setting for a longest period of time or is the most recent administrative switch port setting to be used in association with the one or more device parameter.

In a further alternative, a correlation may be determined to exist where the switch port table shows that a set of one or more device parameters is always associated with a set of one or more switch port settings. For example, if all installed devices of a particular configuration (i.e., installed options and VPD date) have a particular set of switch port settings, then, upon determining that an additional device having the same configuration has been connected to an additional switch port, the additional switch port may be automatically configured with the same set of switch port settings.

In a further embodiment, the method may further include identifying a type of network traffic being communicated from the additional device through the additional switch port. For example, the network traffic type may be, without limitation, Fibre Channel over Ethernet (FCoE), Internet Small Computer System Interface (iSCSI), Ethernet of InfiniBand (TB), or standard communication packets. After identifying the type of network traffic, the switch port settings for the additional switch port may be further modified to use switch port settings correlated to the identified type of network traffic. For example, a first value of a switch port setting may be correlated with FCoE network traffic and a second value of a switch port setting may be correlated with iSCSI. Therefore, if a switch port is connected to a server communicating with FCoE, then the switch port setting may be given the first value. Conversely, if a switch port is connected to a server communicating with iSCSI, then the switch port setting may be given the second value. As a result, the switch port settings are initially a result of the device parameters, but may be modified as a result of the network traffic type. These and further modifications of the switch port settings may be implemented based upon a correlation found in the switch port table.

In yet another embodiment, a switch port table may be stored on a management entity, such as a server. For example, a server may store, for each of the plurality of configured switch ports, the identified switch port settings being used by the configured switch port and the identified device parameters of an installed device connected to the configured switch port. In response to detecting a newly accessible switch, the server may send at least one correlation to the newly accessible switch, wherein the at least one correlation correlates one or more of the device parameters to one or more of the switch port settings. Alternatively, the server may send all or part of the port switch table to the newly accessible switch in response to detecting a newly accessible switch. The switch may then use the correlations or the switch port table to identify the switch port settings that should be applied to each switch port in accordance with the device parameters received from devices connected to each switch port.

Embodiments of the invention may optionally provide a visual indicator adjacent each switch port to identify one or more device parameter of the device connected to the switch port or a communication type being used by the device connected to the switch port. This use of a visual indicator, such as a light emitting diode (LED) may allow a user to visually determine where to plug in new systems or understand the potential consequences of disconnecting a cable connected to that switch port. The visual indicators associated with various switch ports may light differently, such as using different colors, to indicate different devices connected to the switch ports, different device configurations of devices connected to the switch ports, or the type of network traffic being received from the devices connected to the switch ports. For example, each uplink to another switch may be indicated by a red LED, a connection to a compute node may be indicated by a green LED, and a connection to a data storage device may be indicated by a yellow LED, and so forth. Alternatively, where the visual indicator identifies a communication type, a switch port receiving FCoE communications may be indicated by a grey LED and a switch port receiving iSCSI communications may be indicated by a blue LED, and so forth.

In a still further embodiment, a route table in a multi-path environment (such as Torus) may be modified to provide devices of the same type with a communication path of the same number of hops to a data storage device. The number of hops is determined by how many points, such as switches, that a packet must pass through in order to reach the destination. Hops may also be taken into account and route tables updated to ensure that devices of the same type have similarly efficient paths based on where they are connected, when possible. For example, in a multi-path configuration, all compute nodes may be provided route tables that result in normalized communications between them, or a particular point such as storage.

Another embodiment of the present invention provides a computer program product comprising a non-transitory computer readable storage medium having program instructions embodied therewith, the program instructions executable by a processor to cause the processor to perform a method. The method comprises, for each of a plurality of configured switch ports, identifying switch port settings being used by the configured switch port and device parameters of an installed device connected to the configured switch port. The method further comprises correlating one or more of the device parameters to one or more of the switch port settings. In response to an additional device being connected to an additional switch port, the method obtains device parameters of the additional device and automatically configures the additional switch port to use the one or more of the switch port settings that are correlated to one or more of the device parameters matching the device parameters of the additional device.

The foregoing computer program products may further include program instructions for implementing or initiating any one or more aspects of the methods described herein. Accordingly, a separate description of the methods will not be duplicated in the context of a computer program product.

FIG. 1 is a diagram of a computer system 10 that stores a switch port table 20 describing the switch port settings for each port 32 of each switch 30 within the computer system 10. Each switch 30 has a plurality of switch ports 32, where each switch port 32 may be connected to a device 40 with a communication cable 42. Only a few of the devices 40 and cables 42 are shown, but it should be appreciated that a device 40 may be connected to each of the switch ports 32 or any portion of the switch ports 32.

As shown, the switches 30 are in communication with, or are part of, a network 50, such that the devices 40 are able to communicate over the network 50 with each other device 40 or with further devices (not shown). Still further, the switches 30 may be in communication with each other and with a server 60. Each switch may, for example, have an architecture similar to a computer, including a processor, memory and data storage, and may run a Linux-based operating system. Accordingly, the switch is able to execute logic for detecting device parameters and network traffic types, as well as for automatically configuring switch port settings.

One or more of the switches 30 and/or the server 60 stores the switch port table 20. The switch port table 20 includes data describing the switch port settings for each of the switch ports 32 and device parameters of the device 40 that is connected to each of the switch ports 32. The data for the port switch table 20 is obtained from the switches 30 that already have one or more devices 40 connected thereto. For example, if a particular switch 30 has ten devices 40 connected to its switch ports 32, then the device parameters and switch port settings for each of those ten switch ports 32 may be provided to the switch port table 20. Most preferably, the switch port table 20 includes data from all of the switches 30 in the computer system 10, where the data from a given switch 30 includes the device parameters and associated switch port settings for all of the switch ports 32 that are connected to a device 40.

Figure 2:
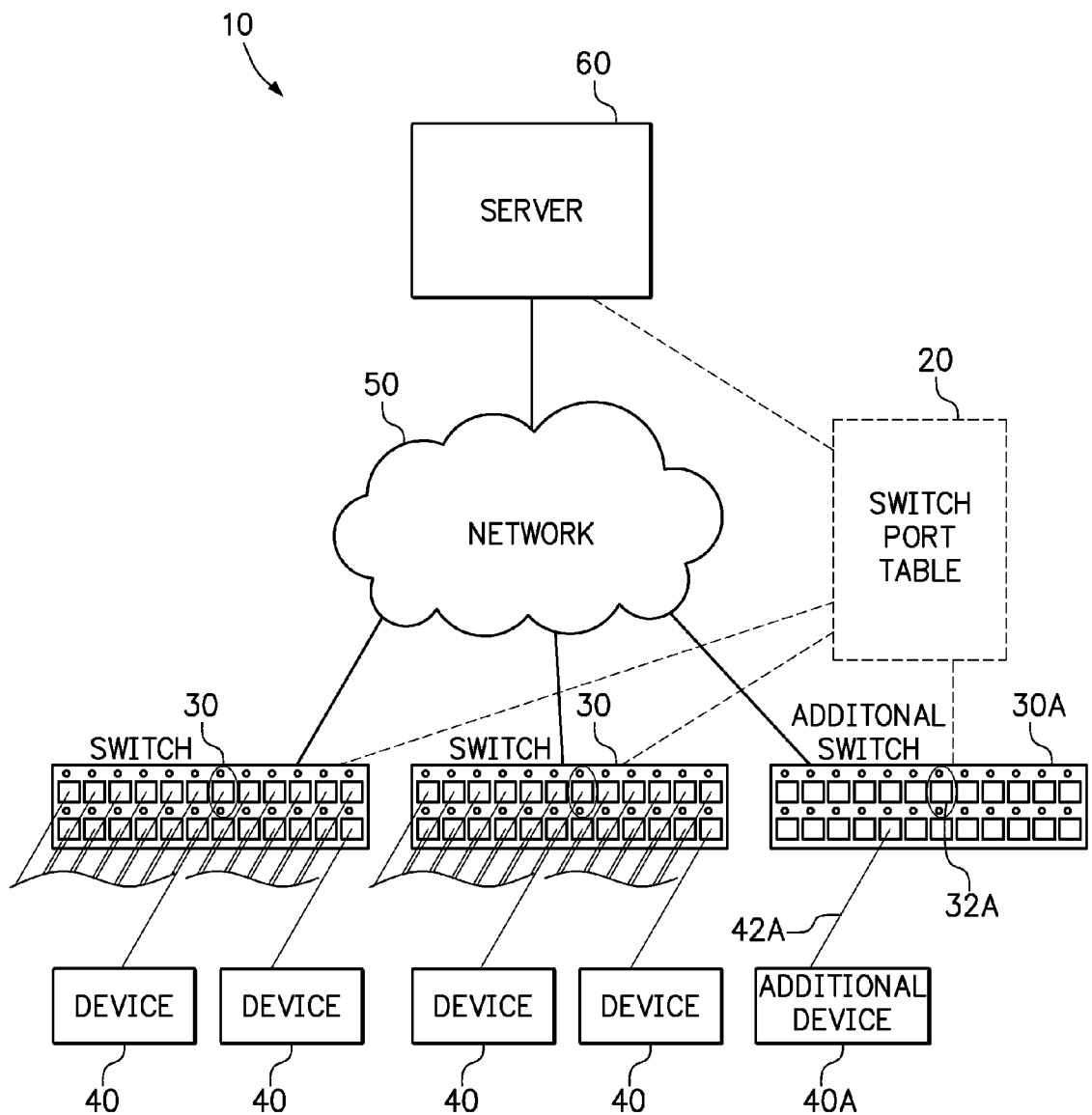
FIG. 2 is a diagram of the computer system of FIG. 1 after connection of an additional switch and an additional device.

FIG. 2 is a diagram of the computer system 10 of FIG. 1 after connection of an additional switch 30A and an additional device 40A. When the switch 30A detects connection to the device 40A via a cable 42A, the switch 30A obtains device parameters from the device 40A. Then, the switch 30A searches the switch port table 20 to determine if one or more of the device parameters are correlated to one or more switch port settings. The switch port table 20 may be downloaded to the switch 30A or the switch 30A may access the switch port table 20 on the operational server 60. Furthermore, the determination of a correlation may be performed by the switch 30A or by the optional server 60. Where the optional server 60 stores a switch port table 20 for the computer system 10, the server 60 may also identify correlations between switch port settings and device parameters, and provide the correlations to the switch 30A. Regardless of how the correlations are determined, the switch 30A may automatically configure the switch port 32A to use the one or more of the switch port settings that are correlated to one or more of the device parameters matching the device parameters of the additional device 40A.

It should be recognized that the foregoing process for automatic configuration of a switch port is the same whether or not the switch port is on the additional switch 30A or one of the previously installed switches. Furthermore, the process for automatic configuration of a switch port may be performed on a switch port that was previously configured for a first device but is now connected to a second device have different device parameters.

Optionally, the switch 30A will update the switch port table 20 to reflect that the particular switch port 32A has been configured with the switch port settings and is connected to the device 40A having the device parameters. In a still further option, the switch port table 20 will be updated whenever a user manually alters the switch port settings for any of the switch ports 32, 32A so that the subsequent configuration of a switch port, in response to connection of an additional device to the switch port, may reflect the users desired switch port settings.

Figure 3:
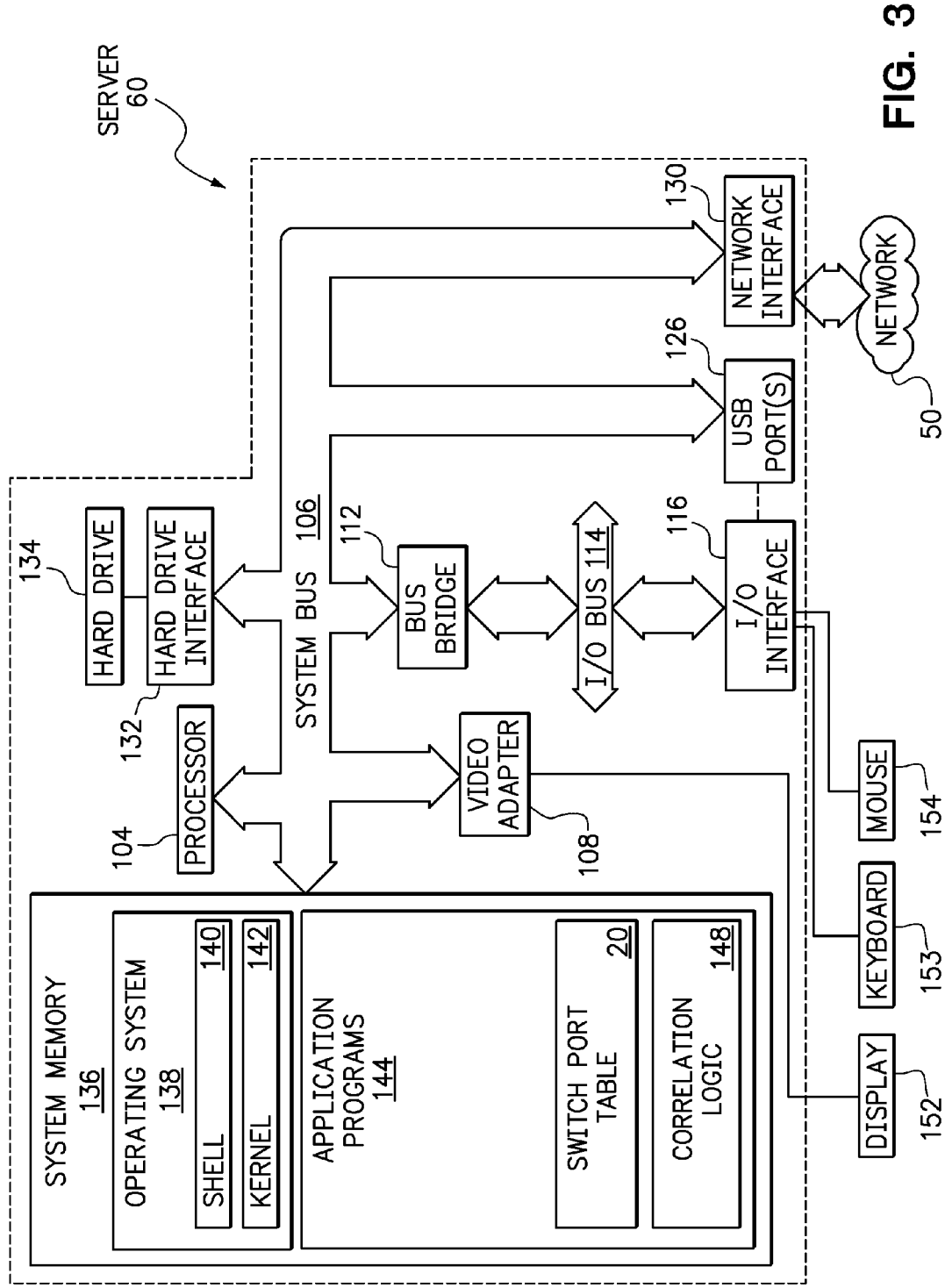
FIG. 3 is a diagram of a computer according to one embodiment of the present invention.

FIG. 3 is a diagram of an exemplary server 60 that may be used in accordance with one embodiment of the present invention. The computer 60 includes a processor unit 104 that is coupled to a system bus 106. Processor unit 104 may utilize one or more processors, each of which has one or more processor cores. A video adapter 108, which drives/supports a display 152, is also coupled to system bus 106. The system bus 106 is coupled via a bus bridge 112 to an input/output (I/O) bus 114. An I/O interface 116 is coupled to I/O bus 114. The I/O interface 116 affords communication with various I/O devices, including a keyboard 153, and a mouse 154. The I/O devices may optionally include storage devices, such as CD-ROM drives and multi-media interfaces, other printers, and external USB port(s). While the format of the ports connected to I/O interface 116 may be any known to those skilled in the art of computer architecture, in a preferred embodiment some or all of these ports are universal serial bus (USB) ports. As depicted, the computer 60 is able to communicate over the network 50 using a network interface 130. The network 50 may be an external network, such as the global communication network, and perhaps also an internal network such as an Ethernet LAN or a virtual private network (VPN).

A hard drive interface 132 is also coupled to system bus 106 and interfaces with a hard drive 134. In a preferred embodiment, the hard drive 134 populates a system memory 136, which is also coupled to system bus 106. System memory is defined as a lowest level of volatile memory in the computer 60. This volatile memory may include additional higher levels of volatile memory (not shown), including, but not limited to, cache memory, registers and buffers. Data that populates the system memory 136 includes the computer's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, the OS 138 also includes a kernel 142, which includes lower levels of functionality for OS 138, including providing essential services required by other parts of OS 138 and application programs 144, including memory management, process and task management, disk management, and mouse and keyboard management. The application programs 144 in the system memory of the computer 60 may include various programs and modules for implementing the methods described herein, such as the switch port table 20 and the correlation logic 148.

The hardware elements depicted in computer 60 are not intended to be exhaustive, but rather are representative components suitable to perform the processes of the present invention. For instance, computer 60 may include alternate memory storage devices such as magnetic cassettes, digital versatile disks (DVDs), Bernoulli cartridges, and the like. These and other variations are intended to be within the spirit and scope of the present invention.

FIG. 4 is an example of a switch port table 20 showing, for each configured switch port, the switch port settings for the switch port and device parameters for the device connected to the switch port. As shown in a first column 21, each switch port is identified by a switch port ID, such as a switch number and a switch port number within that switch.

A group of columns are then populated with switch port settings 22, such as virtual local area network (VLAN) settings, quality of service (QoS) settings, Layer 3 options, speed (i.e., auto/10/100/1000/10000), duplex (Auto/half/full), MAC learning limitations, security settings, violation modes, and the like. The switch port settings 22 stored in the switch port table 20 may include a comprehensive set of switch port settings, but the switch port table 20 may alternatively store only a selected subset of switch port settings that are expected to be correlated to one or more of the device parameters.

Another group of columns are populated with device parameters 23, such as a device type, device model, hardware configuration, operating system, device port, and the like. The device parameters 23 stored in the switch port table 20 may include a comprehensive set of device parameters, but the switch port table 20 may alternatively store only a selected subset of switch port settings that are expected to be correlated to one or more of the switch port settings. For example, if every switch port connected to a server (device type) should be configured into a particular VLAN, then it may not be necessary for the switch port table to store the device model.

Figure 5:
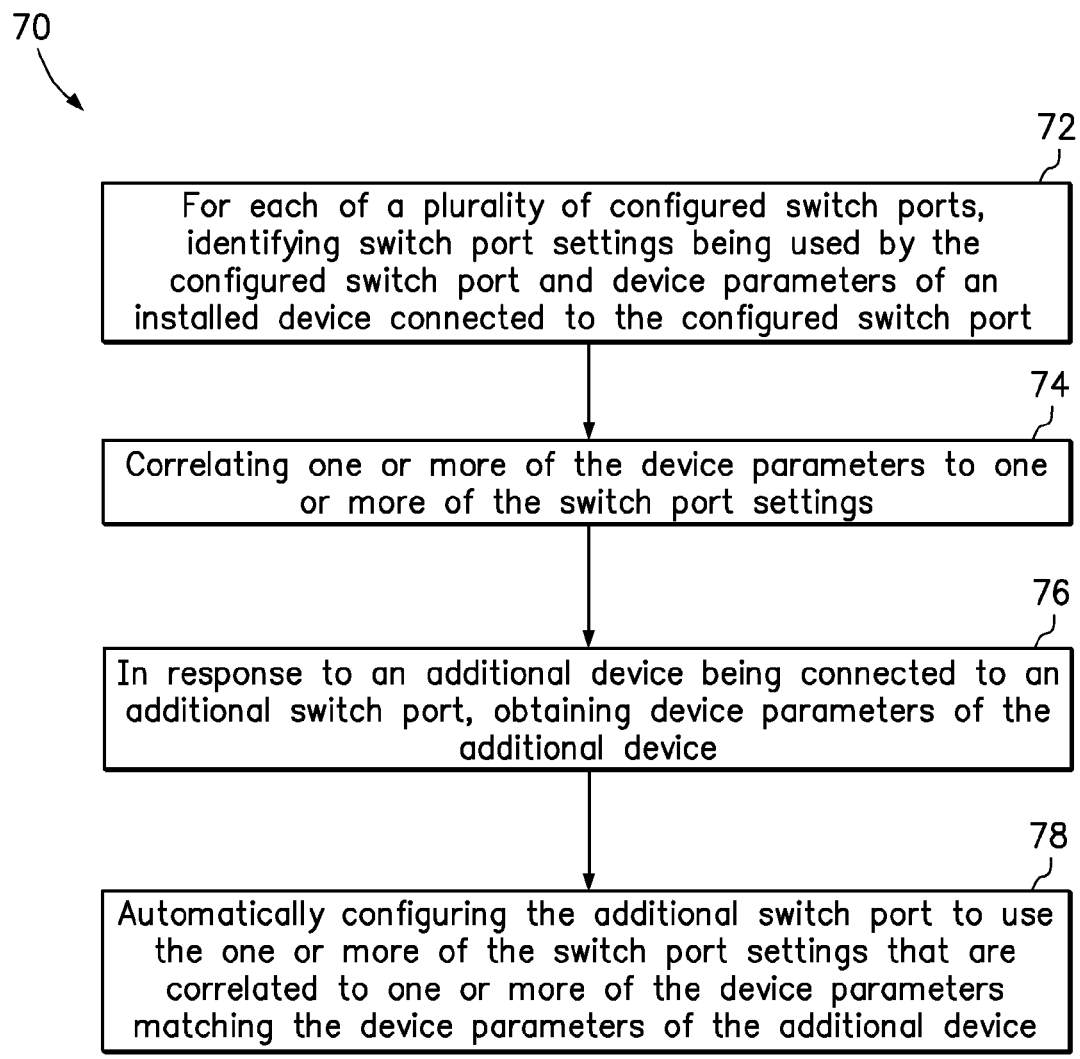
FIG. 5 is a flowchart of a method according to one embodiment of the present invention.

FIG. 5 is a flowchart of a method 70 according to one embodiment of the present invention. In step 72, the method identifies, for each of a plurality of configured switch ports, switch port settings being used by the configured switch port and device parameters of an installed device connected to the configured switch port. In step 74, one or more of the device parameters are determined as being correlated to one or more of the switch port settings. In response to an additional device being connected to an additional switch port, step 76 obtains device parameters of the additional device. Step 78 includes automatically configuring the additional switch port to use the one or more of the switch port settings that are correlated to one or more of the device parameters matching the device parameters of the additional device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
for each of a plurality of configured switch ports, identifying switch port settings being used by the configured switch port and device parameters of an installed device connected to the configured switch port;
correlating one or more of the device parameters to one or more of the switch port settings;
in response to an additional device being connected to an additional switch port, obtaining device parameters of the additional device; and
automatically configuring the additional switch port to use the one or more of the switch port settings that are correlated to one or more of the device parameters matching the device parameters of the additional device.

2. The method of claim 1, wherein the one or more device parameters includes a device type.

3. The method of claim 1, wherein the additional switch port is selected from an unconfigured switch port and a misconfigured switch port.

4. The method of claim 1, wherein the one or more device parameters includes a device type, and the device type is correlated to the one or more of the switch port settings.

5. The method of claim 1, wherein the one or more device parameters is selected from a device hardware configuration, a device operating system, a device port type that is connected to the switch port, and combinations thereof.

6. The method of claim 1, wherein correlating one or more of the device parameters to one or more of the switch port settings, includes identifying one or more device parameters that are always associated with one or more switch port settings.

7. The method of claim 1, wherein correlating one or more of the device parameters to one or more of the switch port settings, includes identifying a set of device parameters that are always associated with an identical set of switch port settings.

8. The method of claim 1, wherein obtaining device parameters of the additional device includes sending a request for the device parameters to the additional device through the additional switch port and receiving the device parameters from the additional device through the additional switch port.

9. The method of claim 8, wherein the request for the device parameters is an intelligent platform management interface message.

10. The method of claim 1, wherein obtaining device parameters of the additional device includes the additional device automatically sending the device parameters in response to detecting a connection to the additional switch port.

11. The method of claim 1, further comprising:
identifying a type of network traffic being communicated from the additional device through the switch port; and
further configuring the additional switch port to use switch port settings correlated to the identified type of network traffic.

12. The method of claim 1, further comprising:
storing, for each of the plurality of configured switch ports, the identified switch port settings being used by the configured switch port and the identified device parameters of an installed device connected to the configured switch port;
detecting a newly accessible switch; and
sending at least one correlation to the newly accessible switch, wherein the at least one correlation correlates one or more of the device parameters to one or more of the switch port settings.

13. The method of claim 1, further comprising:
providing a visual indicator adjacent each switch port to identify one or more device parameter of the device connected to the switch port or a communication type being used by the device connected to the switch port.

14. The method of claim 1, further comprising:
modifying a route table to provide devices of the same type with a communication path of the same number of hops to a data storage device.

15. A computer program product comprising a non-transitory computer readable storage medium having program instructions embodied therewith, the program instructions executable by a processor to:
identify, for each of a plurality of configured switch ports, switch port settings being used by the configured switch port and device parameters of an installed device connected to the configured switch port;
correlate one or more of the device parameters to one or more of the switch port settings;
obtain, in response to an additional device being connected to an additional switch port, device parameters of the additional device; and
automatically configure the additional switch port to use the one or more of the switch port settings that are correlated to one or more of the device parameters matching the device parameters of the additional device.

16. The computer program product of claim 15, wherein the program instructions are further executable by the processor to:
send a request for the device parameters to the additional device through the additional switch port and receive the device parameters from the additional device through the additional switch port.

17. The computer program product of claim 15, wherein the program instructions are further executable by the processor to:
identify a type of network traffic being communicated from the additional device through the switch port; and
further configure the additional switch port to use switch port settings correlated to the identified type of network traffic.

18. The computer program product of claim 15, wherein the program instructions are further executable by the processor to:
store, for each of the plurality of configured switch ports, the identified switch port settings being used by the configured switch port and the identified device parameters of an installed device connected to the configured switch port;
detect a newly accessible switch; and
send at least one correlation to the newly accessible switch, wherein the at least one correlation correlates one or more of the device parameters to one or more of the switch port settings.

19. The computer program product of claim 15, wherein the program instructions are further executable by the processor to:
provide a visual indicator adjacent each switch port to identify one or more device parameter of the device connected to the switch port or a communication type being used by the device connected to the switch port.

20. The computer program product of claim 15, wherein the program instructions are further executable by the processor to:
modify a route table to provide devices of the same type with a communication path of the same number of hops to a data storage device.

21. An apparatus, comprising:
at least one storage device for storing program instructions; and
at least one processor for processing the program instructions to:
identify, for each of a plurality of configured switch ports, switch port settings being used by the configured switch port and device parameters of an installed device connected to the configured switch port;
correlate one or more of the device parameters to one or more of the switch port settings;
obtain, in response to an additional device being connected to an additional switch port, device parameters of the additional device; and
automatically configure the additional switch port to use the one or more of the switch port settings that are correlated to one or more of the device parameters matching the device parameters of the additional device.

22. The apparatus of claim 21, the at least one processor for further processing the program instructions to:
send a request for the device parameters to the additional device through the additional switch port and receive the device parameters from the additional device through the additional switch port.

23. The apparatus of claim 21, the at least one processor for further processing the program instructions to:
identify a type of network traffic being communicated from the additional device through the switch port; and
further configure the additional switch port to use switch port settings correlated to the identified type of network traffic.

24. The apparatus of claim 21, the at least one processor for further processing the program instructions to:
store, for each of the plurality of configured switch ports, the identified switch port settings being used by the configured switch port and the identified device parameters of an installed device connected to the configured switch port;

detect a newly accessible switch; and send at least one correlation to the newly accessible switch, wherein the at least one correlation correlates one or more of the device parameters to one or more of the switch port settings.

25. The apparatus of claim 21, the at least one processor for further processing the program instructions to:

provide a visual indicator adjacent each switch port to identify one or more device parameter of the device connected to the switch port or a communication type being used by the device connected to the switch port.

* * * * *